(12) United States Patent
Everson et al.

(10) Patent No.: US 8,279,776 B1
(45) Date of Patent: Oct. 2, 2012

(54) NETWORK ADDRESS TRANSLATION BASED ON A REVERSE DOMAIN NAME SERVICE

(75) Inventors: John Michael Everson, Leawood, KS (US); James Walter Norris, Kansas City, MO (US); Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 378 days.

(21) Appl. No.: 12/605,935

(22) Filed: Oct. 26, 2009

(51) Int. Cl.
*H04L 12/28* (2006.01)
*H04W 4/00* (2009.01)
(52) U.S. Cl. ............ 370/254; 370/338; 370/401
(58) Field of Classification Search ............ 370/354, 370/338, 401
See application file for complete search history.

(56) References Cited

U.S. PATENT DOCUMENTS

| | | | |
|---|---|---|---|
| 6,084,877 A | 7/2000 | Egbert et al. | |
| 6,151,631 A | 11/2000 | Ansell et al. | |
| 6,614,774 B1 | 9/2003 | Wang | |
| 7,107,360 B1 | 9/2006 | Phadnis et al. | |
| 2005/0185587 A1* | 8/2005 | Klinker | 370/237 |
| 2006/0187858 A1* | 8/2006 | Kenichi et al. | 370/254 |
| 2007/0209067 A1 | 9/2007 | Fogel | |
| 2007/0288607 A1* | 12/2007 | Hsieh | 709/220 |
| 2007/0291650 A1* | 12/2007 | Ormazabal | 370/244 |
| 2008/0201486 A1* | 8/2008 | Hsu et al. | 709/238 |
| 2009/0279520 A1* | 11/2009 | Maki | 370/338 |
| 2010/0174829 A1* | 7/2010 | Drako | 709/245 |
| 2011/0075643 A1* | 3/2011 | Natan et al. | 370/338 |

* cited by examiner

*Primary Examiner* — Brandon Renner

(57) ABSTRACT

In a communication system, a gateway receives an IP message having source IP address and port number and having a destination IP address and port number. The gateway system transfers the IP message with a different destination IP address. A base station receives the IP message and wirelessly transfers the IP message to a routing system. The routing system transfers a reverse DNS query for the source IP address and receives a DNS reply indicating a domain name. The routing system selects a network address translation set based on the domain name, translates a destination port number into another destination IP address using the network address translation set, and transfers the IP message with the other destination IP address.

20 Claims, 10 Drawing Sheets

NETWORK ADDRESS TRANSLATION BASED ON A REVERSE DOMAIN NAME SERVICE

TECHNICAL BACKGROUND

A Radio Access Network (RAN) exchanges Internet Protocol (IP) messages between the Internet and wireless user systems. The wireless user systems may be coupled to multiple local devices. The IP protocol used on the RAN may restrict IP addressing, so that wireless user system does not have individual IP addresses for each of the local devices.

A Domain Name Service (DNS) server stores IP addresses in association with domain names. Typically, the IP addresses change over time, but the domain names remain the same. When the IP address for an internet server changes, the server registers its new IP address with its domain name in the DNS server. Security measures are implemented by the DNS server, so only an authorized system can register a new IP address with a domain name. User devices may then query the DNS server with the domain name to obtain the new IP address for the internet server. In a reverse DNS scenario, the user device can query the DNS server with the new IP address to obtain the domain name.

OVERVIEW

In a communication system, a gateway receives an IP message having source IP address and port number and having a destination IP address and port number. The gateway system transfers the IP message with a different destination IP address. A base station receives the IP message and wirelessly transfers the IP message to a routing system. The routing system transfers a reverse DNS query for the source IP address and receives a DNS reply indicating a domain name. The routing system selects a network address translation set based on the domain name, translates a destination port number into another destination IP address using the network address translation set, and transfers the IP message with the other destination IP address.

DETAILED DESCRIPTION

Figure 1:
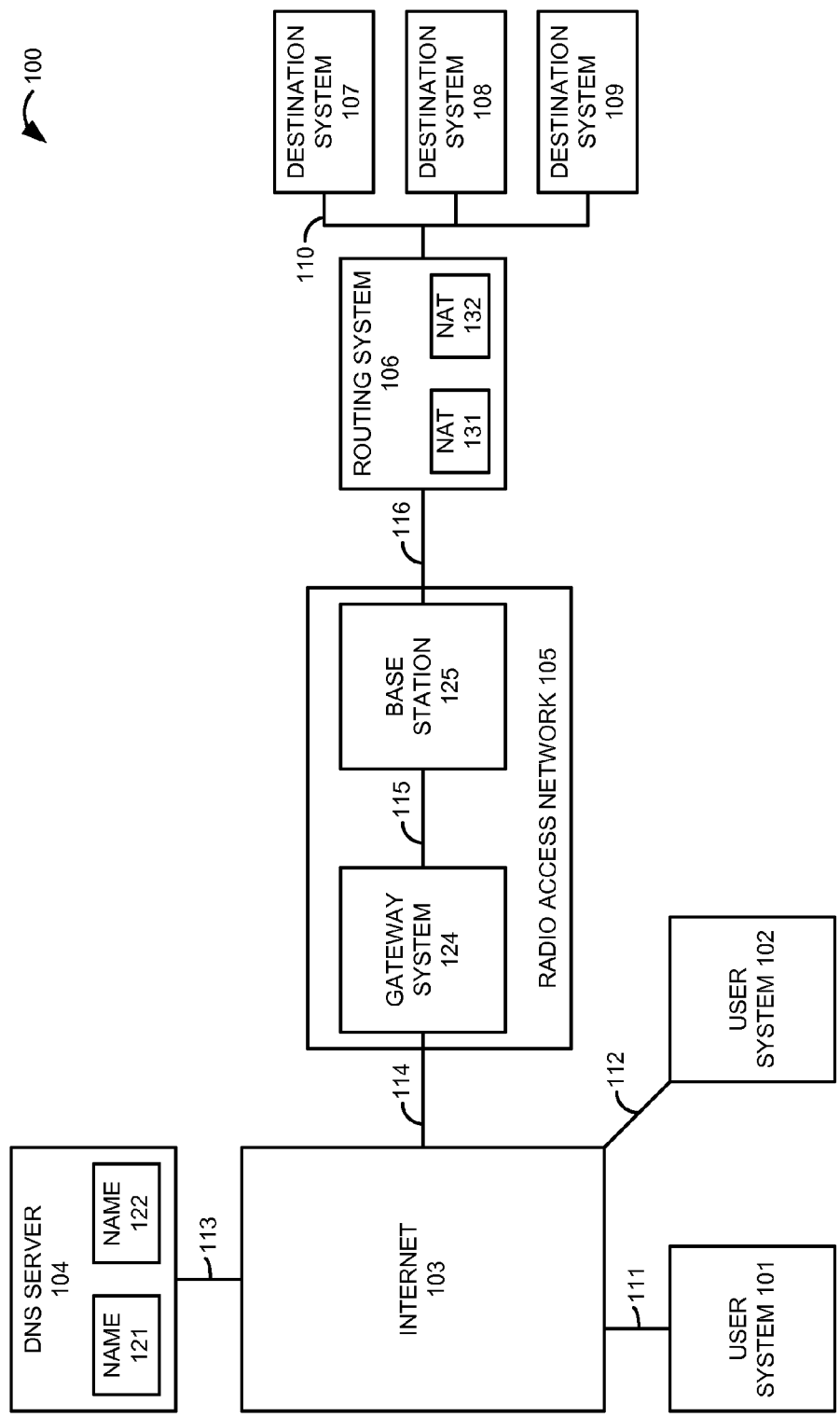
FIG. 1 illustrates a communication system that translates network addresses based on a reverse domain name service.
Figure 2:
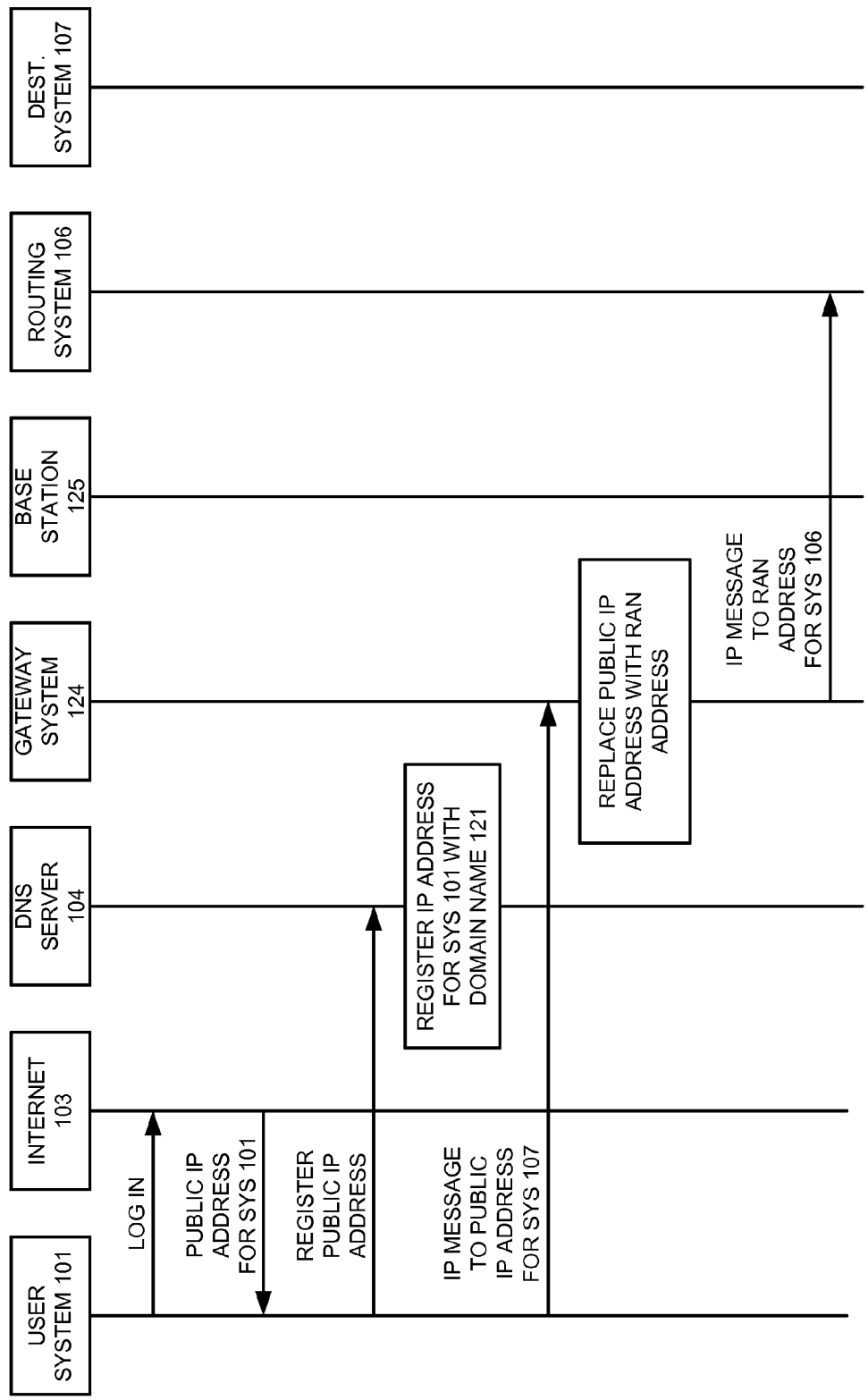
FIG. 2 illustrates the operation of the communication system to translate network addresses based on the reverse domain name service.

FIG. 1 illustrates communication system 100. Communication system 100 comprises user systems 101-102, internet 103, Domain Name Service (DNS) server 104, Radio Access Network (RAN) 105, routing system 106, and destination systems 107-109. RAN 105 comprises gateway system 124 and base station 125. User systems 101-102 and destination systems 107-109 are components capable of network communication, such as computers, telephones, servers, cameras, media players, internet appliances, data storage devices, and the like. In DNS server 104, user system 101 is authorized to associate its internet address with domain name 121, and user system 102 is authorized to associate its internet address with domain name 122.

User system 101 and DNS server 104 communicate over internet 103 and communication links 111 and 113. User system 101 and gateway system 124 communicate over internet 103 and communication links 111 and 114. User system 102 and DNS server 104 communicate over internet 103 and communication links 112 and 113. User system 102 and gateway system 124 communicate over internet 103 and communication links 112 and 114. DNS server 104 and gateway system 124 communicate over internet 103 and communication links 113 and 114. Gateway system 124 and base station 125 communicate over communication link 115. Base station 125 and routing system 106 wirelessly communicate over wireless communication link 116. Routing system 106 and destination systems 107-109 communicate over Local Area Network (LAN) 110.

Routing system 106 includes Network Address Translation (NAT) sets 131 and 132. Each of these NAT sets controls how routing system 106 translates internet addresses between communication link 116 and LAN 110. In routing system 106, domain name 121 is associated with NAT set 131, and domain name 122 is associated with NAT set 132.

Destination systems 107-109 have public IP addresses that could be static or dynamic. These public IP addresses allow other systems, such as user systems 101-102, to communicate over internet 103 with destination systems 107-109. Due to a protocol restriction on RAN 105 (or some other limitation), the public IP addresses for destination systems 107-109 are homed to gateway system 124. This homing causes internet 103 and RAN 105 to route IP messages directed to these public IP addresses to gateway system 124. Gateway system 124 maintains an association between the RAN address of routing system 106 and the public IP addresses for destination systems 107-109.

FIGS. 2-7 illustrate the operation of communication system 100. User system 101 logs-in to internet 103—typically through an internet service provider—and receives a public Internet Protocol (IP) address from a dynamically-assigned public IP address pool. User system 101 registers its dynamic public IP address in association with domain name 121 in DNS server 104. DNS server 104 associates the public IP address for user system 101 with domain name 121. Thus, another system with internet access can use the dynamically-assigned public IP address for user system 101 to communicate over internet 103 with user system 101. If the other system knows domain name 121, but does not know the public IP address for user system 101, then the other system can send domain name 121 to DNS server 104 over internet 103 to obtain the public IP address for user system 101.

User system 101 initiates a communication with destination system 107 by sending an IP message that is addressed as follows:

destination address: public IP address for destination system 107,
    destination port: number for destination system 107,
    source address: public IP address for user system 101, and
    source port: number for user system 101.

Based on the destination address for destination system 107, internet 103 routes the IP message to gateway system 124.

For transfer over RAN 105, gateway system 124 translates the destination IP address into the RAN address for routing system 106. In some examples, the destination port number for system 107 is already correlated to destination system 107 in NAT set 131, and no translation of the destination port number is needed by gateway system 124. In other examples (and as illustrated here), there is no such correlation, so based on the destination IP address for destination system 107, gateway system 124 translates the destination port number into a special number that is correlated to destination system 107 in NAT set 131. The IP message is now addressed as follows:

destination address: RAN address for routing system 106,
    destination port: special number correlated to destination system 107,
    source address: public IP address for user system 101, and
    source port: number for user system 101.

Gateway system 124 transfers the IP message, and RAN 105 routes the IP message to routing system 106 based on the destination RAN address. Note that base station 125 wirelessly transfers this IP message to routing system 106.

Figure 3:
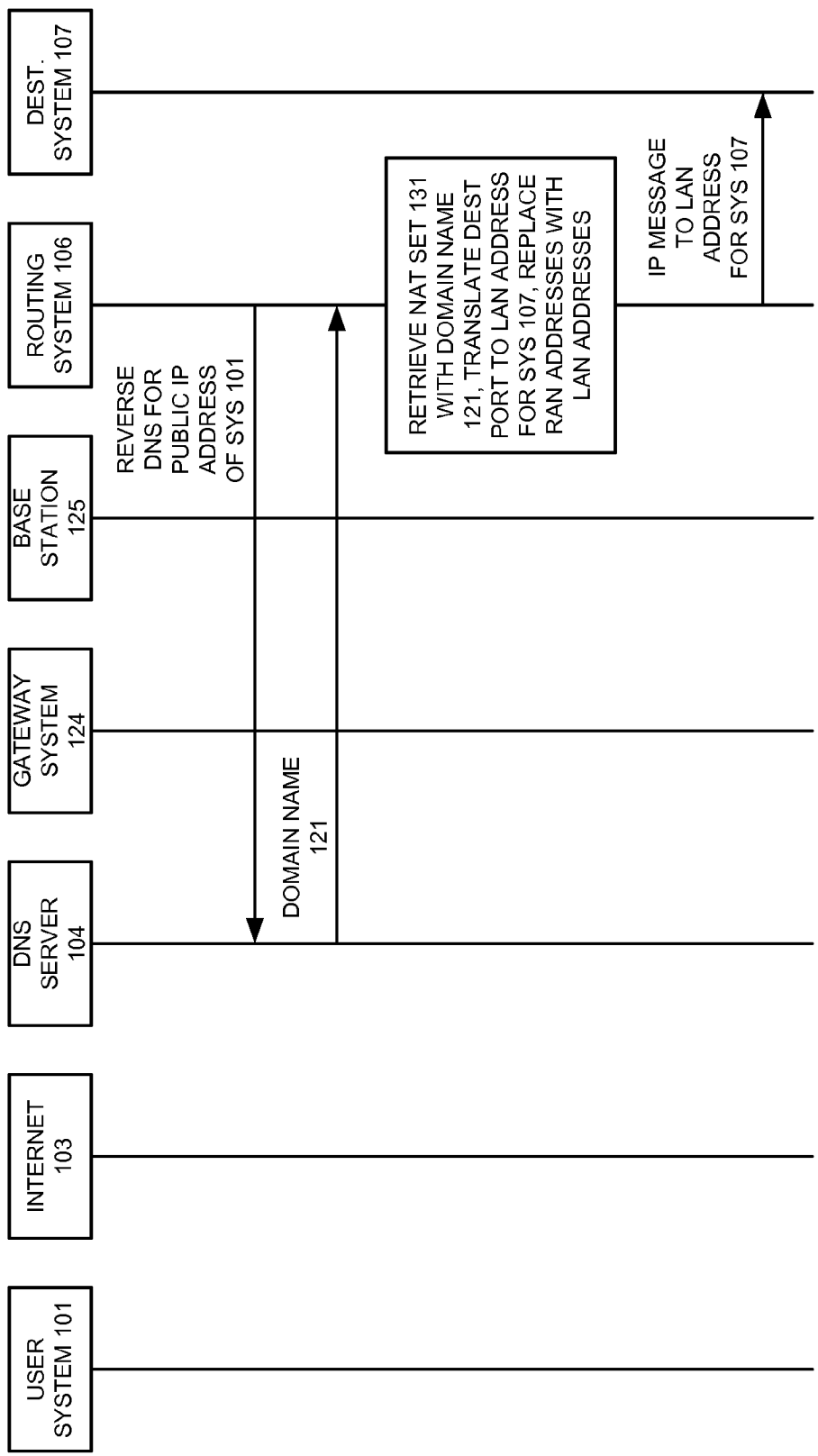
FIG. 3 illustrates the operation of the communication system to translate network addresses based on the reverse domain name service.

Referring now to FIG. 3, routing system 106 performs a reverse DNS look-up on the source IP address in the received IP message which is the public IP address for user system 101. In response, DNS server 104 returns the associated domain name 121 to routing system 106. Routing system 106 then uses domain name 121 to retrieve associated NAT set 131. Routing system 106 uses NAT set 131 to translate the destination port number (the special number in this example) into the LAN address of destination system 107. Routing system 106 also translates the source address to a LAN address for routing system 106. The IP message is now addressed as follows:

destination address: LAN address for destination system 107,
    destination port: special number correlated to destination system 107,
    source address: LAN address for routing system 106, and
    source port: number for user system 101.

Routing system 106 transfers the IP message over LAN 110, and LAN 110 delivers the IP message to destination system 107.

Figure 4:
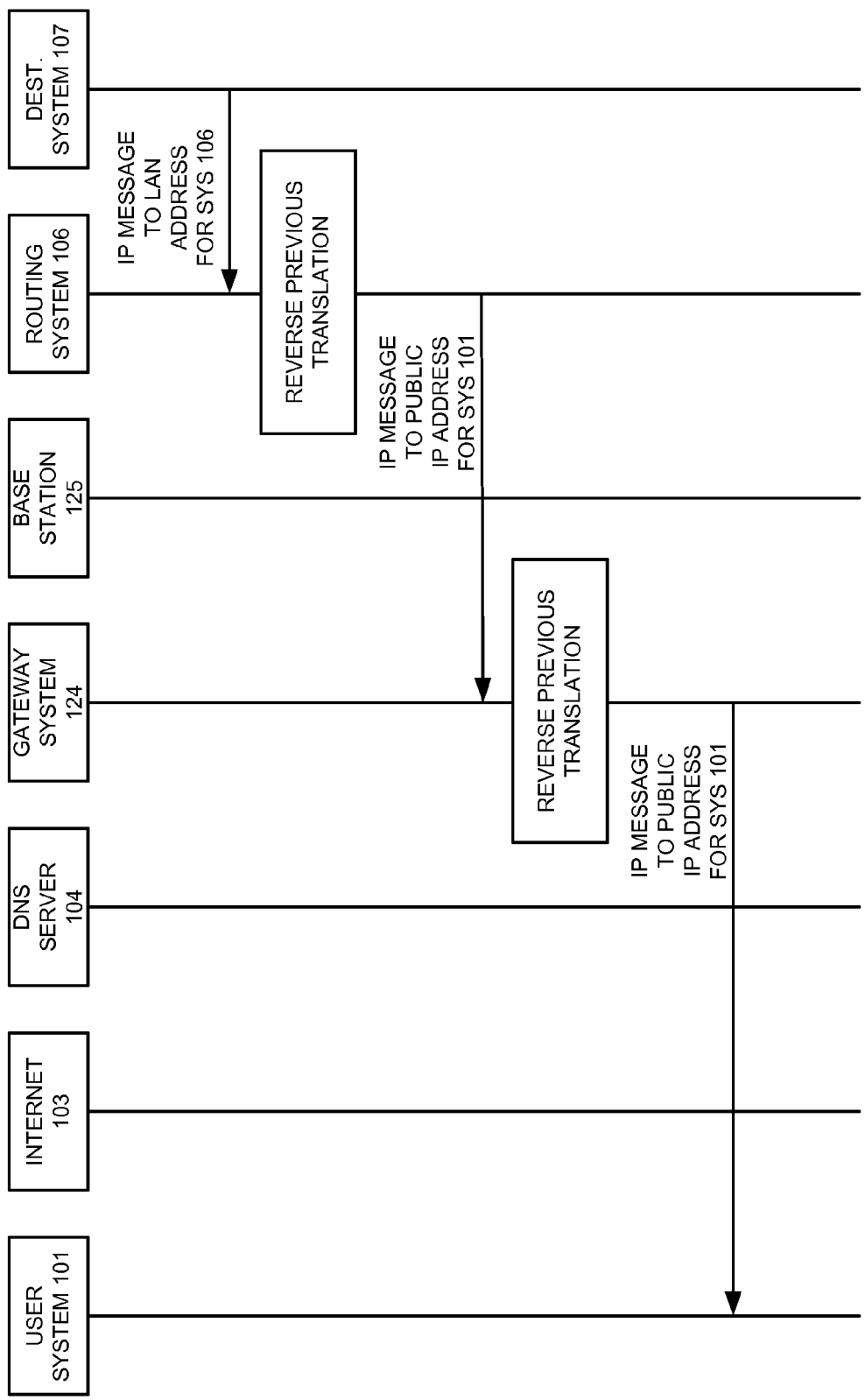
FIG. 4 illustrates the operation of the communication system to translate network addresses based on the reverse domain name service.

Referring now to FIG. 4, destination system 107 responds to user system 101 with an IP message over LAN 110. The response IP message is addressed as follows:

destination address: LAN address for routing system 106,
    destination port: number for user system 101,
    source address: LAN address for destination system 107, and
    source port: special number correlated to destination system 107.

LAN 110 delivers the IP message to routing system 106. Routing system 106 reverses its previous translations. The response IP message is now addressed as follows:

destination address: public IP address for user system 101,
    destination port: number for user system 101,
    source address: RAN address for routing system 106, and
    source port: special number correlated to destination system 107.

Routing system 124 wirelessly transfers the response IP message to base station 125 for delivery to gateway system 124. Gateway system 124 also reverses its previous address translations. The response IP message is now addressed as follows:

destination address: public IP address for user system 101,
    destination port: number for user system 101,
    source address: public IP address for destination system 107, and
    source port: number for destination system 107.

Gateway system 124 transfers the IP message to user system 101 over internet 103.

Figure 5:
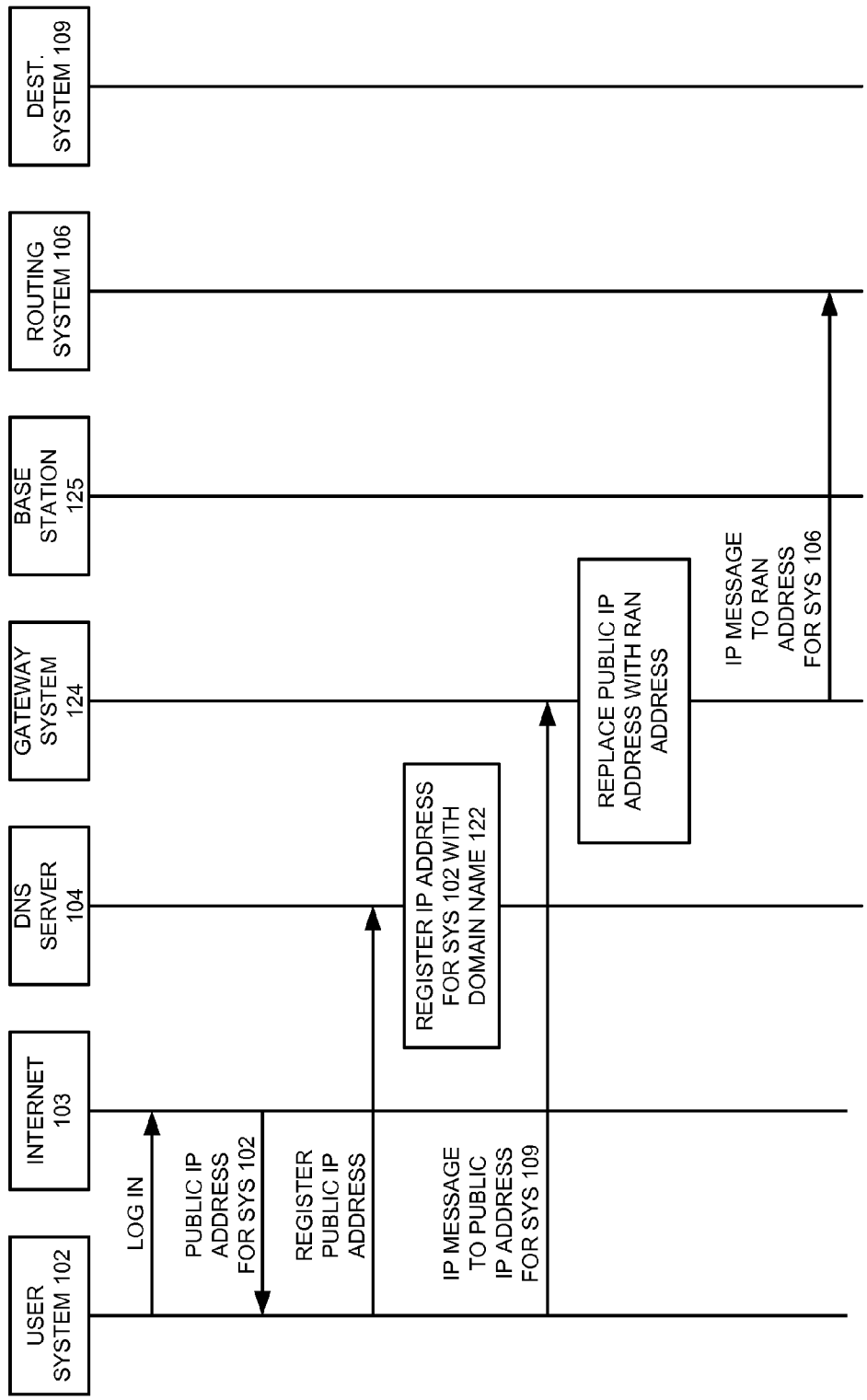
FIG. 5 illustrates the operation of the communication system to translate network addresses based on the reverse domain name service.

Referring to FIG. 5, a different user system 102 now logs-in to internet 103—typically through an internet service provider—and receives a different public IP address from the public IP address pool. User system 102 registers its dynamic public IP address with domain name 122 in DNS server 104. DNS server 104 stores the public IP address for user system 102 in association with domain name 122.

User system 102 initiates a communication with destination system 109 by sending an IP message that is addressed as follows:

destination address: public IP address for destination system 109,
    destination port: number for destination system 109,
    source address: public IP address for user system 102, and
    source port: number for user system 102.

Based on the public IP address for destination system 109, internet 103 routes the IP message to gateway system 124.

For transfer over RAN 105, gateway system 124 translates the destination IP address into the RAN address for routing system 106. In this example, the destination port number for system 109 is correlated to destination system 109 in NAT set 132 and no translation of the destination port number is needed by gateway system 124. The IP message is now addressed as follows:

destination address: RAN address for routing system 106,
    destination port: number for destination system 109,
    source address: public IP address for user system 102, and
    source port: number for user system 102.

Gateway system 124 transfers the IP message, and RAN 105 routes the IP message to routing system 106 based on the destination RAN address. Note that base station 125 wirelessly transfers the message to routing system 106.

Figure 6:
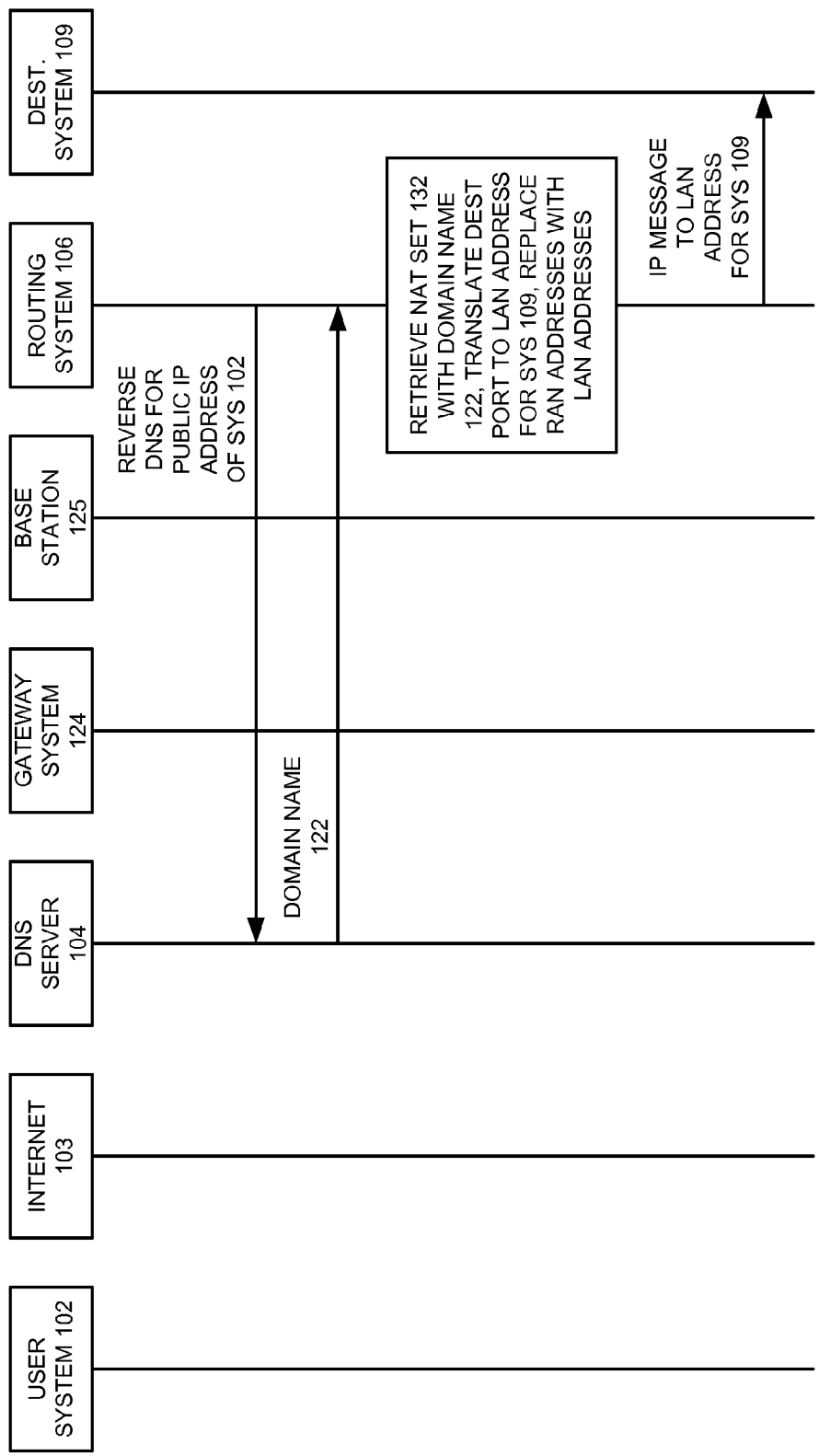
FIG. 6 illustrates the operation of the communication system to translate network addresses based on the reverse domain name service.

Referring now to FIG. 6, routing system 106 performs a reverse DNS look-up on the source IP address in the IP message—the public IP address for user system 102. In response, DNS server 104 returns the associated domain name 122 to routing system 106. Routing system 106 then uses domain name 122 to retrieve associated NAT set 132. Routing system 106 uses NAT set 132 to translate the destination port number into the LAN address of destination system 109. Routing system 106 also translates the source address to a LAN address for routing system 106. The IP message is now addressed as follows:

destination address: LAN address for destination system 109,
    destination port: number for destination system 109,
    source address: LAN address for routing system 106, and
    source port: number for user system 102.

Routing system 106 transfers the IP message over LAN 110, and LAN 110 delivers the IP message to destination system 109.

Figure 7:
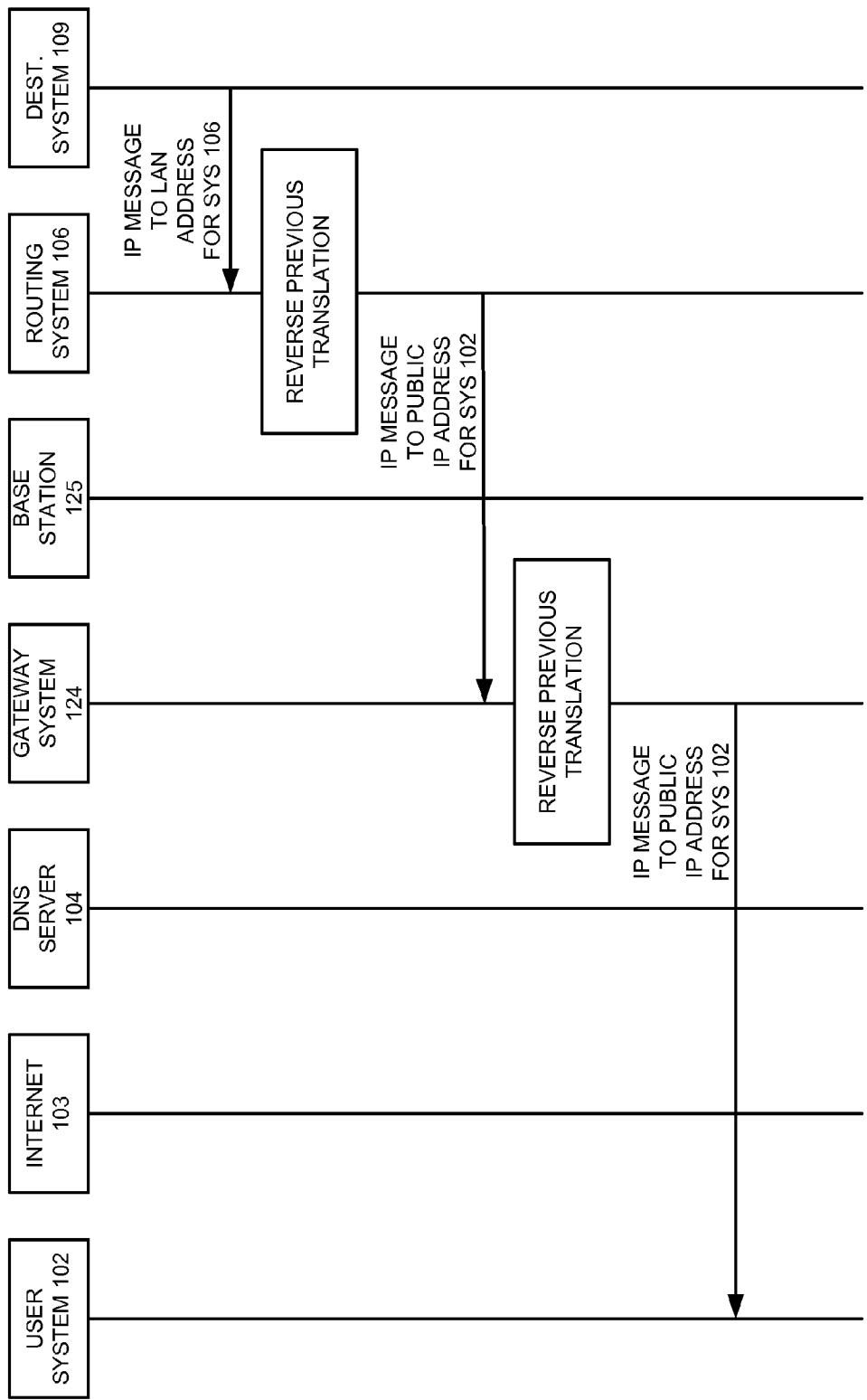
FIG. 7 illustrates the operation of the communication system to translate network addresses based on the reverse domain name service.

Referring now to FIG. 7, destination system 109 responds to user system 102 with an IP message over LAN 110. The response IP message is addressed as follows:
    destination address: LAN address for routing system 106,
    destination port: number for user system 102,
    source address: LAN address for destination system 109, and
    source port: number for destination system 109.

LAN 110 delivers the IP message to routing system 106. Routing system 106 reverses its previous translations. The response IP message is now addressed as follows:
    destination address: public IP address for user system 102,
    destination port: number for user system 102,
    source address: RAN address for routing system 106, and
    source port: number for destination system 109.

Routing system 124 wirelessly transfers the response IP message to base station 125 for delivery to gateway system 124. Gateway system 124 also reverses its previous address translations. The response IP message is now addressed as follows:
    destination address: public IP address for user system 102,
    destination port: number for user system 102,
    source address: public IP address for destination system 109, and
    source port: number for destination system 109.

Gateway system 124 transfer the IP message to user system 102 over internet 103.

In the above described operation, note that dynamic public IP addresses can be used over internet 103 to provide authorized user systems with controlled access to destination systems 107-109. Also note that RAN addresses are used over RAN 105, and LAN addresses are used over LAN 110. The RAN addresses could be WIMAX addresses or LTE addresses in various implementations.

In the above described operation, the reverse DNS provides various levels of controlled access to destination systems 107-109 by determining which NAT set, if any, is used by routing system 106. For example, unauthorized users who cannot register their IP address with either domain name 121 or 122 would be blocked by routing system 106, since a reverse DNS on their source IP address will not return a valid domain name for any NAT set. Routing system 106 will block this traffic. In another example, expert technicians who are authorized to register their dynamic IP addresses to a special domain name could be given special access by routing system 106, since the reverse DNS will return a valid domain name for a special-access NAT set. In yet another example, standard employees who are authorized to register their dynamic IP addresses to a standard domain name (but not to the special domain name) could be given standard access by routing system 106, since the reverse DNS will return a valid domain name for a standard-access NAT set. To illustrate in the above operation, user system 101 may be able to access all destination systems 107-109 with domain name 121 and NAT set 131, but user system 102 may only be able to access destination system 109 with domain name 122 and NAT set 132.

Referring back to FIG. 1, internet 103 comprises computer systems, routers, and links that transfer IP messages based on destination addresses. DNS server 104 comprises a computer and communication system that associates domain names with IP addresses and handles DNS queries. Gateway system 124 comprises a computer and communication system that interfaces between IP and RAN systems. Base station 125 comprises a RAN communication interface, processing system, and RF communication circuitry. The RF communication circuitry typically includes an antenna, amplifier, filter, RF modulator, and signal processing circuitry. Routing system 106 comprises a processing system, RF communication circuitry, and LAN communication interface. The RF communication circuitry typically includes an antenna, amplifier, filter, RF modulator, and signal processing circuitry. The LAN communication interface typically includes physical ports and signal processing circuitry. LAN 110 could be an Ethernet LAN or use some other LAN protocol. LAN 110 and communication links 111-115 use metal, glass, air, space, or some other material as the transport media. LAN 110 and communication links 111-115 could use various communication protocols, such as Time Division Multiplex (TDM), Internet Protocol (IP), Ethernet, Code Division Multiple Access (CDMA), Global System for Mobile Communication (GSM), Evolution Data Only (EVDO), Worldwide Interoperability for Microwave Access (WIMAX), Long Term Evolution (LTE), or some other communication format—including combinations thereof. LAN 110 and communication links 111-115 could be direct links or may include intermediate networks, systems, or devices. Wireless link 116 uses the air or space as the transport media. Wireless link 116 may use various protocols, such as Code Division Multiple Access (CDMA), Global System for Mobile Communication (GSM), Evolution Data Only (EVDO), Worldwide Interoperability for Microwave Access (WIMAX), Long Term Evolution (LTE), or some other wireless communication format. Wireless link 116 could be a direct link or may include intermediate networks, systems, or devices. Note that communication system 100 has been simplified for clarity, but system 100 typically includes additional components. For example, there are typically additional user systems, base stations, routing systems, and destination systems.

Figure 8:
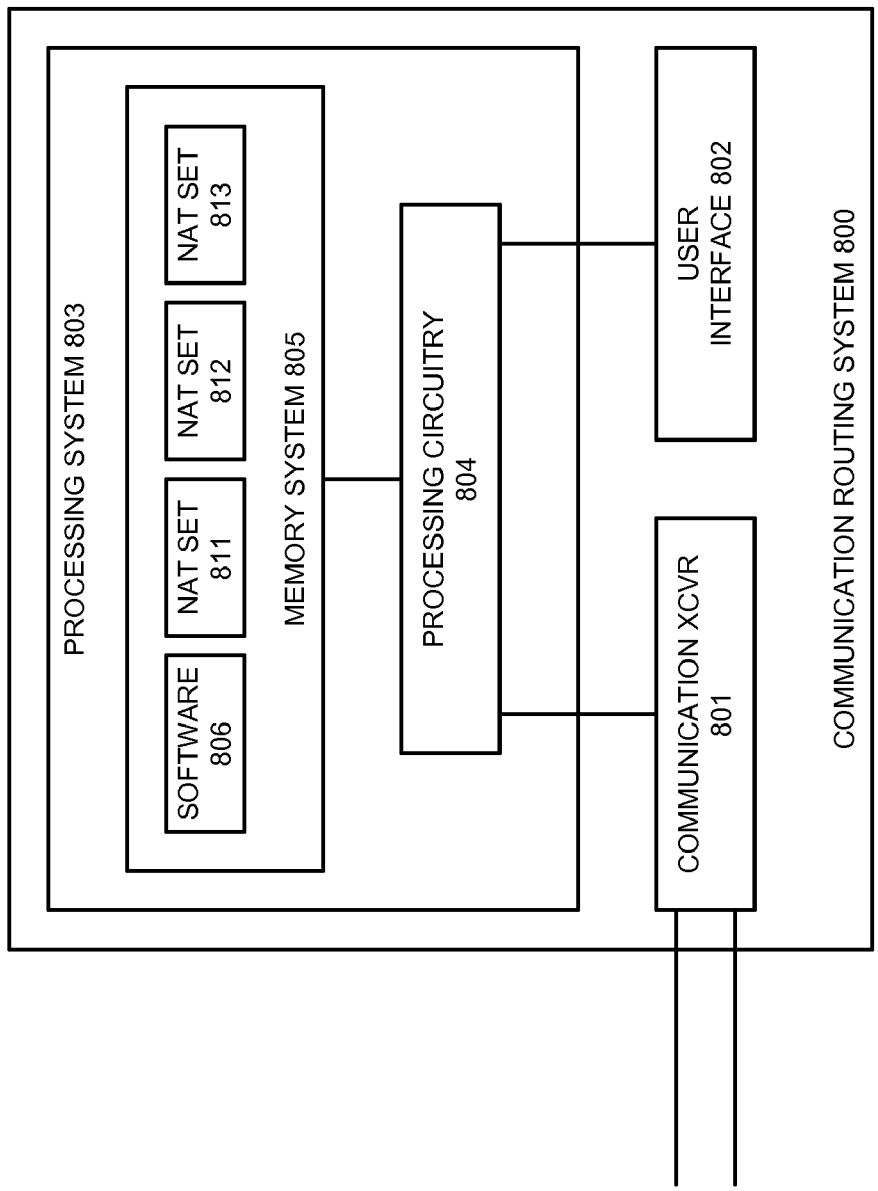
FIG. 8 illustrates a communication routing system that translates network addresses based on a reverse domain name service.

FIG. 8 illustrates communication routing system 800. Communication routing system 800 is an example of communication routing system 106, although system 106 may use alternative configurations. Communication routing system 800 could be a discrete system, a distributed system, or could be integrated into other systems. Communication routing system 800 comprises communication transceiver 801, user interface 802, and processing system 803. Processing system 803 comprises processing circuitry 804 and memory system 805 that stores operating software 806 and NAT sets 811-813. Processing system 803 is linked to transceiver 801 and user interface 802. Communication routing system 800 may include other well-known components that are not shown for clarity, such as enclosures and power systems.

Communication transceiver 801 comprises a physical communication port, signal processing circuitry, software, and/or some other communication components. Communication transceiver 801 may use various protocols, such as Internet Protocol (IP), Time Division Multiplex (TDM), Ethernet, Code Division Multiple Access (CDMA), Global System for Mobile Communication (GSM), Evolution Data Only (EVDO), Worldwide Interoperability for Microwave Access (WIMAX), Long Term Evolution (LTE), or some other communication format—including combinations thereof. Communication transceiver 801 is equipped to exchange IP messages (including DNS messages) over a communication network as described herein. Communication transceiver 801 may include wireless communication capability, but wireless communication capability is not required for communication routing system 800.

User interface 802 comprises components that interact with a user. The components may include a keyboard, display, lights, buttons, touch-screen, touch-pad, speaker, microphone, or the like.

Processing circuitry 804 comprises microprocessor and other circuitry that retrieves and executes operating software 806 from memory system 805. Memory system 805 comprises a computer-readable storage medium, such as a disk drive, flash drive, data storage circuitry, or some other memory apparatus. Memory system 805 could be a single device or be distributed across multiple devices. Processing circuitry 804 is typically mounted on one or more circuit boards that may also hold memory system 804 and portions of components 801-802.

Operating software 806 comprises computer programs, firmware, or some other form of computer-readable processing instructions. Operating software 806 may include an operating system, utilities, drivers, network interfaces, applications, or some other type of software. When executed by processing circuitry 804, operating software 804 directs processing system 803 to initiate reverse DNS queries for source IP addresses, select individual NAT sets 811-813 based on a domain names (if any) in the reverse DNS responses, translate destination port numbers into new destination IP addresses using the selected NAT sets, and initiate transfers of IP messages using the new destination IP addresses.

Figure 9:
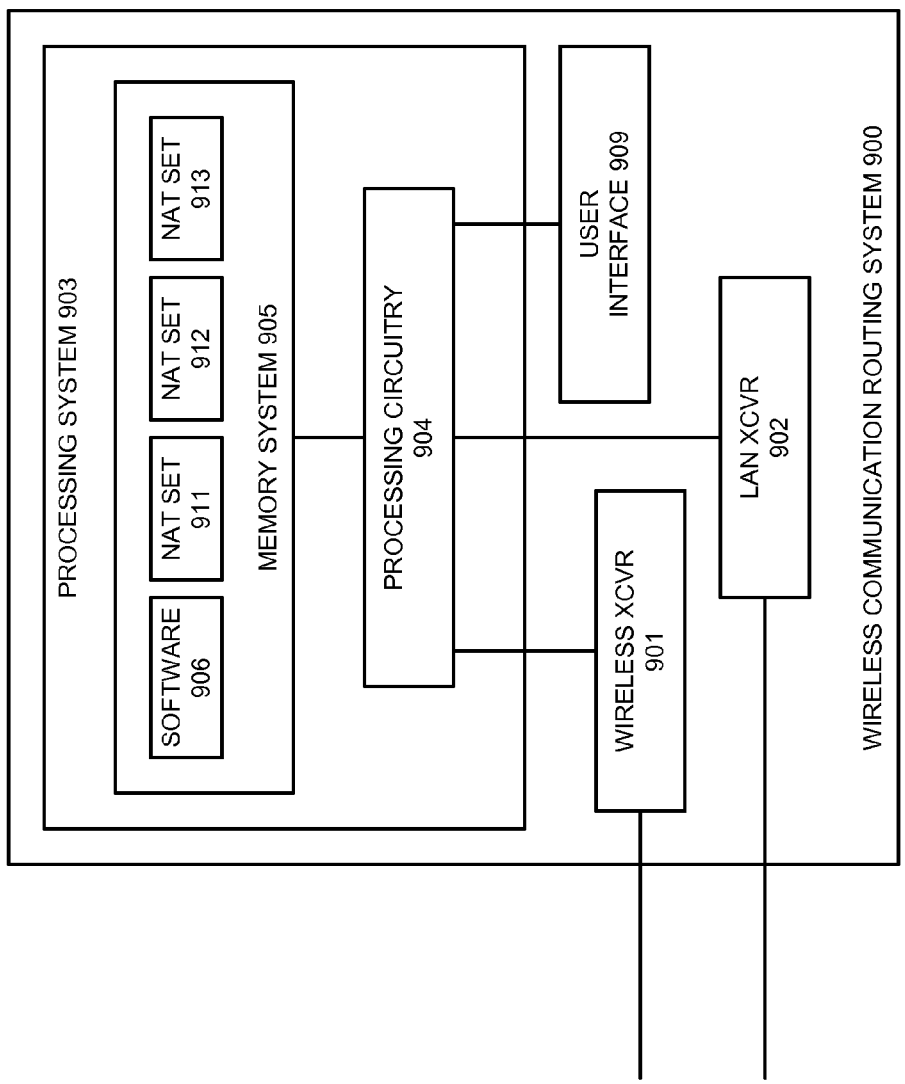
FIG. 9 illustrates a wireless communication routing system that translates network addresses based on a reverse domain name service.

FIG. 9 illustrates wireless communication routing system 900. Wireless communication routing system 900 is an example of communication routing systems 106 and 800, although systems 106 and 800 may use alternative configurations. Wireless communication routing system 900 could be a discrete system, a distributed system, or could be integrated into other systems. Wireless communication routing system 900 comprises wireless communication transceiver 901, Local Area Network (LAN) transceiver 902, user interface 909, and processing system 903. Processing system 903 comprises processing circuitry 904 and memory system 905 that stores operating software 906 and NAT sets 911-913. Processing system 903 is linked to transceivers 901-902 and user interface 909. Wireless communication routing system 900 may include other well-known components that are not shown for clarity, such as enclosures and power systems.

Wireless communication transceiver 901 comprises an antenna, filter, amplifier, signal processing circuitry, software, and/or some other communication components. Communication transceiver 901 may use various wireless protocols for Internet Protocol (IP) message transfers, such as Code Division Multiple Access (CDMA), Global System for Mobile Communication (GSM), Evolution Data Only (EVDO), Worldwide Interoperability for Microwave Access (WIMAX), Long Term Evolution (LTE), or some other wireless communication format—including combinations thereof. Wireless communication transceiver 901 is equipped to exchange IP messages (including DNS messages) over a radio access network as described herein.

LAN communication transceiver 902 comprises a physical communication port, signal processing circuitry, software, and/or some other communication components. LAN communication transceiver 902 may use various LAN protocols, such as Internet Protocol (IP), Ethernet, or some other LAN communication format—including combinations thereof. LAN communication transceiver 902 is equipped to exchange IP messages over a LAN as described herein.

User interface 909 comprises components that interact with a user. The components may include a keyboard, display, lights, buttons, touch-screen, touch-pad, speaker, microphone, or the like.

Processing circuitry 904 comprises microprocessor and other circuitry that retrieves and executes operating software 906 from memory system 905. Memory system 905 comprises a computer-readable storage medium, such as a disk drive, flash drive, data storage circuitry, or some other memory apparatus. Memory system 905 could be a single device or be distributed across multiple devices. Processing circuitry 904 is typically mounted on one or more circuit boards that may also hold memory system 904 and portions of components 901-902 and 909.

Operating software 906 comprises computer programs, firmware, or some other form of computer-readable processing instructions. Operating software 906 may include an operating system, utilities, drivers, network interfaces, applications, or some other type of software. When executed by processing circuitry 904, operating software 904 directs processing system 903 to initiate reverse DNS queries for source IP addresses, select individual NAT sets 911-913 based on domain names (if any) in the reverse DNS responses, translate destination port numbers into a new destination IP addresses using the selected NAT sets, and initiate transfers of IP messages using the new destination IP addresses.

Figure 10:
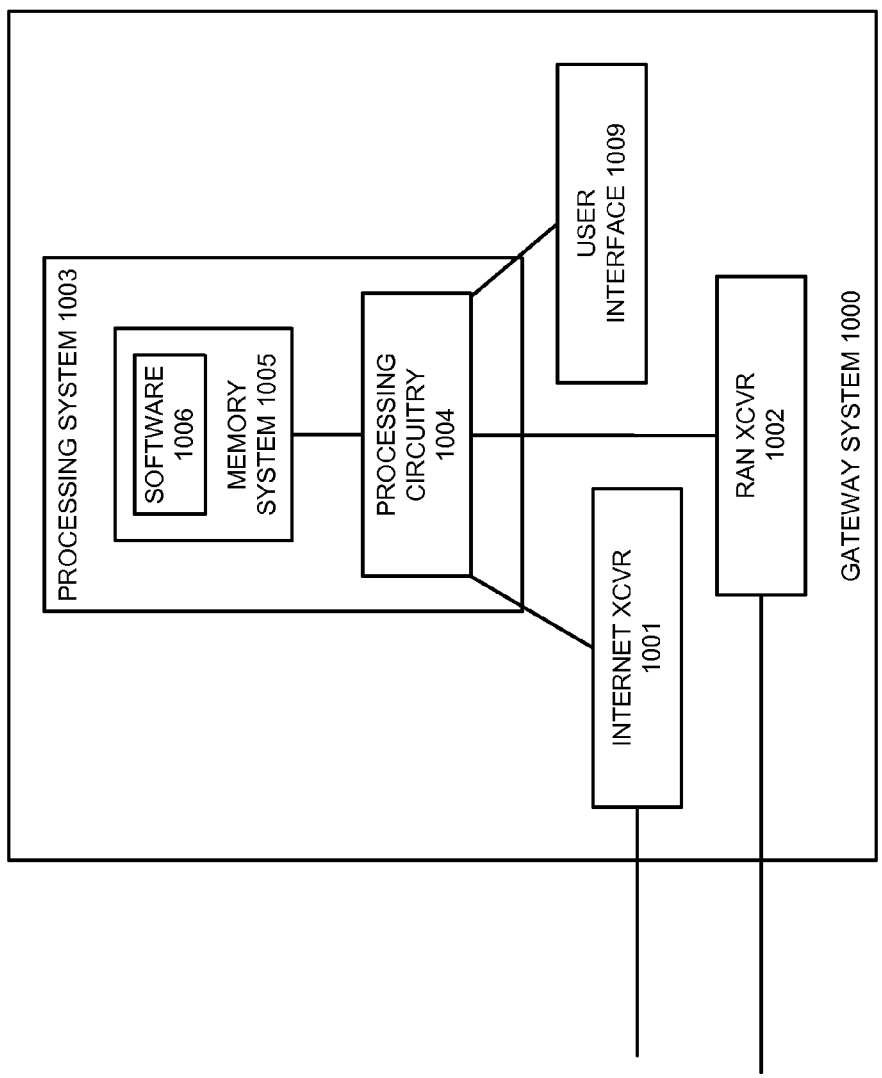
FIG. 10 illustrates a radio access network gateway system.

FIG. 10 illustrates gateway system 1000. Gateway system 1000 is an example of gateway system 124, although system 124 may use alternative configurations. Gateway system 1000 could be a discrete system, a distributed system, or could be integrated into other systems. Gateway system 1000 comprises internet communication transceiver 1001, Radio Area Network (RAN) transceiver 1002 user interface 1009, and processing system 1003. Processing system 1003 comprises processing circuitry 1004 and memory system 1005 that stores operating software 1006. Processing system 1003 is linked to transceivers 1001-1002 and user interface 1009. Gateway system 1000 may include other well-known components that are not shown for clarity, such as enclosures, databases, application servers, and power systems.

Internet communication transceiver 1001 comprises physical communication ports, signal processing circuitry, software, and/or some other communication components. Internet communication transceiver 1001 may use various protocols, such as IP, TDM, Ethernet, wireless, or some other communication format—including combinations thereof. Internet communication transceiver 1001 is equipped to exchange IP messages over an IP network as described herein.

RAN communication transceiver 1002 comprises a physical communication port, signal processing circuitry, software, and/or some other communication components. RAN communication transceiver 902 may use various RAN protocols, such as IP, TDM, Ethernet, wireless, or some other RAN communication format—including combinations thereof. RAN communication transceiver 902 is equipped to exchange IP messages over a RAN as described herein.

User interface 1009 comprises components that interact with a user. The components may include a keyboard, display, lights, buttons, touch-screen, touch-pad, speaker, microphone, or the like.

Processing circuitry 1004 comprises microprocessor and other circuitry that retrieves and executes operating software 1006 from memory system 1005. Memory system 1005 comprises a computer-readable storage medium, such as a disk drive, flash drive, data storage circuitry, or some other memory apparatus. Memory system 1005 could be a single device or be distributed across multiple devices. Processing circuitry 1004 is typically mounted on one or more circuit boards that may also hold memory system 1004 and portions of components 1001-1002 and 1009.

Operating software 1006 comprises computer programs, firmware, or some other form of computer-readable processing instructions. Operating software 1006 may include an operating system, utilities, drivers, network interfaces, applications, or some other type of software. When executed by processing circuitry 1004, operating software 1004 directs processing system 1003 to translate addresses and port numbers as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
   in a gateway system, receiving an Internet Protocol (IP) message sourced from a source IP address and a first port number and directed to a public IP address of a destination and a second port number, processing the public IP address of the destination to identify an intermediate IP address associated with a routing system, and transferring the IP message directed to the intermediate IP address;
   in a base station, receiving the IP message, and in response to the intermediate IP address, wirelessly transferring the IP message to the routing system;
   in the routing system, wirelessly receiving the IP message, transferring a reverse Domain Name Service (DNS) query for the source IP address, receiving a reverse DNS reply indicating a domain name for the source IP address, selecting one of a plurality of network address translation sets based on the domain name, translating the second port number into a local IP address of the destination using the selected one of the network address translation sets, and transferring the IP message directed to the local IP address of the destination.

2. The method of claim 1 wherein the gateway system comprises a radio access network gateway and the base station comprises a radio access network base station.

3. The method of claim 1 wherein the base station and the routing system wirelessly communicate using a Worldwide Interoperability for Microwave Access protocol.

4. The method of claim 1 wherein the base station and the routing system wirelessly communicate using a Long Term Evolution protocol.

5. The method of claim 1 wherein a user system is associated with the domain name and the domain name is associated with the selected one of the network address translation sets, wherein the user system:
   obtains the source IP address from a dynamic IP address pool;
   associates the source IP address with the domain name in a DNS;
   transfers the IP message sourced from the source IP address.

6. The method of claim 1 wherein the intermediate IP address comprises a radio access network address, and the local IP address comprises a local area network IP address.

7. A method of operating a communication routing system comprising:
   in a communication transceiver, receiving an Internet Protocol (IP) message having a source IP address, public destination IP address, and destination port number;
   in a processing system, initiating a reverse Domain Name Service (DNS) query for the source IP address;
   in the communication transceiver, transferring the reverse DNS query and receiving a reverse DNS reply indicating a domain name for the source IP address;
   in the processing system, selecting one of a plurality of network address translation sets based on the domain name, translating the destination port number into a local destination IP address using the selected one of the network address translation sets, and initiating a transfer of the IP message using the local destination IP address; and
   in the communication transceiver, transferring the IP message having the local destination IP address.

8. The method of claim 7 wherein receiving the IP message, transferring the reverse DNS query, and receiving the reverse DNS response comprises wirelessly receiving the IP message, wirelessly transferring the reverse DNS query, and wirelessly receiving the reverse DNS response.

9. The method of claim 8 wherein wirelessly receiving the IP message, wirelessly transferring the reverse DNS query, and wirelessly receiving the reverse DNS response comprising using a Worldwide Interoperability for Microwave Access (WIMAX) protocol.

10. The method of claim 9 wherein the local IP address comprises a WIMAX system address that was put in the IP message by a WIMAX gateway.

11. The method of claim 8 wherein wirelessly receiving the IP message, wirelessly transferring the reverse DNS query, and wirelessly receiving the reverse DNS response comprising using a Long Term Evolution (LTE) protocol.

12. The method of claim 11 wherein the local IP address comprises an LTE system address that was put in the IP message by an LTE gateway.

13. The method of claim 7 wherein a user system is associated with the domain name and the domain name is associated with the selected one of the network address translation sets, wherein the user system:
   obtains the source IP address from a dynamic IP address pool;
   associates the source IP address with the domain name in a DNS;
   transfers the IP message having the source IP address.

14. A communication routing system comprising:
   a communication transceiver configured to receive an Internet Protocol (IP) message having a source IP address, public destination IP address, and destination port number;
   a processing system configured to initiate a reverse Domain Name Service (DNS) query for the source IP address;
   the communication transceiver configured to transfer the reverse DNS query and receive a reverse DNS reply indicating a domain name for the source IP address;
   the processing system configured to select one of a plurality of network address translation sets based on the domain name, translate the destination port number into a local destination IP address using the selected one of the network address translation sets, and initiate a transfer of the IP message using the local destination IP address; and
   the communication transceiver configured to transfer the IP message having the local destination IP address.

15. The communication routing system of claim 14 wherein the communication transceiver is configured to wirelessly receive the IP message, wirelessly transfer the reverse DNS query, and wirelessly receive the reverse DNS response.

16. The communication routing system of claim 15 wherein the communication transceiver is configured to wirelessly receive the IP message, wirelessly transfer the reverse DNS query, and wirelessly receive the reverse DNS response using a Worldwide Interoperability for Microwave Access (WIMAX) protocol.

17. The communication routing system of claim 16 wherein the local IP address comprises a WIMAX system address that was put in the IP message by a WIMAX gateway.

18. The communication routing system of claim 15 wherein the communication transceiver is configured to wirelessly receive the IP message, wirelessly transfer the reverse DNS query, and wirelessly receive the reverse DNS response comprising using a Long Term Evolution (LTE) protocol.

19. The communication routing system of claim 18 wherein the local IP address comprises an LTE system address that was put in the IP message by an LTE gateway.

20. The communication routing system of claim 14 wherein a user system is associated with the domain name and the domain name is associated with the selected one of the network address translation sets, wherein the user system:
   obtains the source IP address from a dynamic IP address pool;
   associates the source IP address with the domain name in a DNS;
   transfers the IP message having the source IP address.

* * * * *